(12) United States Patent
Okumura et al.

(10) Patent No.: US 6,327,434 B1
(45) Date of Patent: Dec. 4, 2001

(54) CAMERA

(75) Inventors: Yoichiro Okumura, Hino; Yoji Watanabe, Fuchu, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/517,878

(22) Filed: Mar. 2, 2000

(30) Foreign Application Priority Data

Mar. 12, 1999 (JP) .................................................. 11-066370

(51) Int. Cl.[7] .................................................. G03B 15/06
(52) U.S. Cl. .......................... 396/62; 396/106; 396/157; 396/175
(58) Field of Search ............................. 396/62, 106, 157, 396/175

(56) References Cited

U.S. PATENT DOCUMENTS 4,462,666 * 7/1984 Orban ...................................... 396/62

FOREIGN PATENT DOCUMENTS 9-61896    3/1997 (JP) .

* cited by examiner

*Primary Examiner*—W. B. Perkey
(74) *Attorney, Agent, or Firm*—Frishauf, Holtz, Goodman, Langer & Chick, P.C.

(57) ABSTRACT

A camera is provided, which can appropriately control the electronic flash irradiation area when the electronic flash device capable of setting its irradiation angle in a plurality of ways is used as an AF auxiliary light source, thus improving the use efficiency of the auxiliary light and reducing wasteful energy consumption. In the camera of the present invention, the control unit automatically controls an electronic flash irradiation angle to the narrow electronic flash emitting unit regardless of the imaging angle which was set, while performing the distance measurement operation in cooperation with the electronic flash.

28 Claims, 6 Drawing Sheets

CAMERA

CROSS-REFERENCE TO RELATED APPLICATION

This application is based upon and claims the benefit of priority from the prior Japanese Patent Application No. 11-066370, filed Mar. 12, 1999; the entire contents of which are incorporated herein by reference.

BACKGROUND OF THE INVENTION

The present invention relates to a camera having an electronic flash equipment which can be used as an auxiliary light source for auto-focusing (to be called as AF hereinafter), and having a function in which the AF auxiliary light covers a range area regardless of its shooting view angle.

Conventionally, for an AF operation, AF detection auxiliary light is used when the brightness of an object to be photographed is low or the contrast is low.

Examples of the technique for emitting AF detection auxiliary light while an AF operation of a camera, are as follows. First, a technique in which an LED or light bulb serving as exclusive light emitting means is provided for an electronic flash equipment or camera body so as to emit AF detection auxiliary light, is known. Second, a technique in which the electronic flash equipment is appropriated, and a very small amount of light emission is created by utilizing its light adjustment function, is known.

Further, these days, as the usage rate of the zoom lens increases, an electronic flash equipment capable of controlling the flash irradiation angle, has been put into practical use.

More specifically, for example, Jpn. Pat. Appln. KOKAI Publication No. 9-61896 discloses a technique regarding an electronic flash equipment of a camera, including the first light emitting means for irradiating light at the first light distribution angle and the second light emitting means for irradiating light at a light distribution angle narrower than the first light distribution angle, characterized in that either one of the first and second light emitting means is selected to perform preliminary light emission which is carried out before an exposure to a film, thereby optimizing the amount of light emission in the preliminary irradiation of light.

However, in the case where there are a plurality of ways in the light emission by the flash equipment, it suffices if the AF auxiliary light covers an AF detection area only.

Further, with the technique disclosed in the above Jpn. Pat. Appln. KOKAI Publication No. 9-61896, where auxiliary light is necessary, the reliability of subject distance data obtained without using auxiliary light is low, and therefore it is not appropriate to control the irradiation angle based on such data. Further, the focal point detection area is situated at a center of the image or in its vicinity, whereas the flashing light for imaging covers the image in its entirety. Therefore, in the case where auxiliary light is used, the light is irradiated also onto the area other than the focal point detection area, thus wasting energy.

BRIEF SUMMARY OF THE INVENTION

The present invention has been proposed in consideration of the above-described drawbacks of the prior art technique, and the object thereof is to enhance the auxiliary light usage efficiency by appropriately controlling the flashing light irradiation range in the case of a flash equipment whose irradiation angle can be set at a plurality of ways, and at the same time, to reduce the energy consumption by avoiding wasteful use of energy.

In order to achieve the above-described object, there is provided according to the first aspect of the present invention, a camera comprising: a zoom lens, detection means for detecting a focal length of the zoom lens, electronic flash means for irradiating electronic flash onto an object to be photographed, capable of setting a first irradiation angle to cover an image view angle of a wide angle side of the zoom lens, and a second irradiation angle which is narrower than the first irradiation angle; first selection means for selecting either one of the first and second irradiation angles in accordance with the focal length detected by the detection means; distance measurement means for measuring a distance to the object to be photographed, located in a distance measurement area within an imaging view angle, by operating the electronic flash means on the basis of object conditions; and second selection means for selecting the second irradiation angle regardless of the selection made by the first selection means, when the distance to the object is measured with use of the electronic flash means.

Further, there is provided according to the second aspect of the present invention, a camera comprising: a zoom lens; detection means for detecting a focal length of the zoom lens; electronic flash means for irradiating electronic flash onto an object to be photographed, capable of changing its irradiation angle; first irradiation angle setting means for setting an irradiation angle of the electronic flash means; distance measurement means for measuring a distance to the object to be photographed, located in a distance measurement area within an imaging view angle, by operating the electronic flash means on the basis of object conditions; and second irradiation angle setting means for setting an irradiation angle of the electronic flash means when the distance to the object is measured with use of the electronic flash means.

Further, there is provided according to the second aspect of the present invention, a camera comprising: a zoom lens; detection means for detecting a focal length of the zoom lens; electronic flash means for irradiating electronic flash onto an object to be photographed, capable of changing its irradiation angle; first irradiation angle setting means for setting an irradiation angle of the electronic flash means; distance measurement means for measuring a distance to the object to be photographed, located in a distance measurement area within an imaging view angle, by operating the electronic flash means on the basis of object conditions; and second irradiation angle setting means for setting an irradiation angle of the electronic flash means when the distance to the object is measured with use of the electronic flash means.

Further, there is provided according to the third aspect of the present invention, a camera comprising: an imaging lens capable of varying a focal length; electronic flash means for irradiating electronic flash onto an object to be photographed; imaging means for executing an imaging operation with use of the electronic flash means when the object to be photographed has a low brightness; distance measurement means for measuring a distance to the object to be photographed, located in a distance measurement area within an image plane, by operating the electronic flash means to emit light on the basis of object conditions; and irradiation angle setting means for setting an irradiation angle of the electronic flash means in accordance with the focal distance of the imaging lens in the imaging operation, and for setting the irradiation angle of the electronic flash means at a predetermined angle when the measurement distance is measured with use of the electronic flash means.

Further, there is provided according to the fourth aspect of the present invention, a camera comprising: an imaging lens capable of varying a focal length; electronic flash means for irradiating electronic flash onto an object to be photographed; imaging means for executing an imaging operation; distance measurement means for measuring a distance to the object to be photographed, located in a distance measurement area within an image plane; and control unit for setting an irradiation angle of the electronic flash means at an appropriate angle for the distance measurement area when the measurement distance is measured with use of the electronic flash means to emit light, and setting the irradiation angle of the electronic flash means in accordance with the focal distance of the imaging lens in the imaging operation.

Further, there is provided according to the fifth aspect of the present invention, a camera comprising: imaging angle changing means; a electronic flash unit for irradiating electronic flash onto an object to be photographed; electronic flash irradiation angle changing means for changing an irradiation angle of the electronic flash unit; distance measurement means having a distance measurement area within an image plane, for outputting a signal for adjusting a focal point of an imaging leans; and control unit for setting a electronic flash irradiation angle at a narrow angle side when the measurement distance is measured in cooperation with the electronic flash unit.

Further, there is provided according to the sixth aspect of the present invention, a camera comprising: distance measurement means for outputting a signal necessary for a focusing operation; detection means for detecting an imaging angle; and an artificial light source for irradiating light onto an object to be photographed at a distribution light angle at least a same as or narrower than the imaging angle detected by the detection means, out of a plurality of distribution light angles.

Further, there is provided according to the seventh aspect of the present invention, a camera comprising: an artificial light source capable of changing a light distribution angle; imaging means for carrying out an imaging operation with use of the artificial light source; distance measurement means for executing a distance measurement operation for outputting a signal necessary for a focusing operation, using the artificial light source; and control means for switching a light distribution angle of the artificial light source over between a case where the photographing is executed by irradiating an object with the artificial light source and a case where the distance measurement operation is executed by irradiating an object with the artificial light source.

Further, there is provided according to the eighth aspect of the present invention, a camera comprising: distance measurement unit for measuring a distance from an object to be photographed, a light emitting unit having at least two types of irradiation angles, a wide angle and narrow angle, a zooming unit for determining an imaging angle out of a plurality of them, and a control unit for irradiating an object to be photographed at a narrow irradiation angle without regard to the imaging angle when measuring the distance.

Further, there is provided according to the ninth aspect of the present invention, a camera comprising: distance measurement unit for measuring a distance from an object to be photographed, for focusing, a light emitting unit capable of changing an irradiation angle from a wide angle to a narrow angle; a zooming unit for changing an imaging angle from a wide more to a telemode; and a control unit for irradiating an object to be photographed at a narrow irradiation angle without regard to the imaging angle when measuring the distance.

Further, there is provided according to the tenth aspect of the present invention, a camera comprising: a zoom lens; a focal length detection unit for detecting a focal length position of the zoom lens; a distance measurement unit for measuring a distance from an object to be photographed; a light emitting unit capable of changing an irradiation angle from a wide angle to a narrow angle, for irradiating light; and a control unit for setting the irradiation angle of the light emitting unit at an optimal angle for the focal length position before carrying out a distance re-measurement operation which involves auxiliary light emitted by the light emitting unit, when a distance measurement by the distance measurement unit fails, thereby shortening a time lag created between the distance measurement to the distance re-measurement which involves the auxiliary light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiment of the present invention will now be described with reference to accompanying drawings.

Figures 1A, 1B:
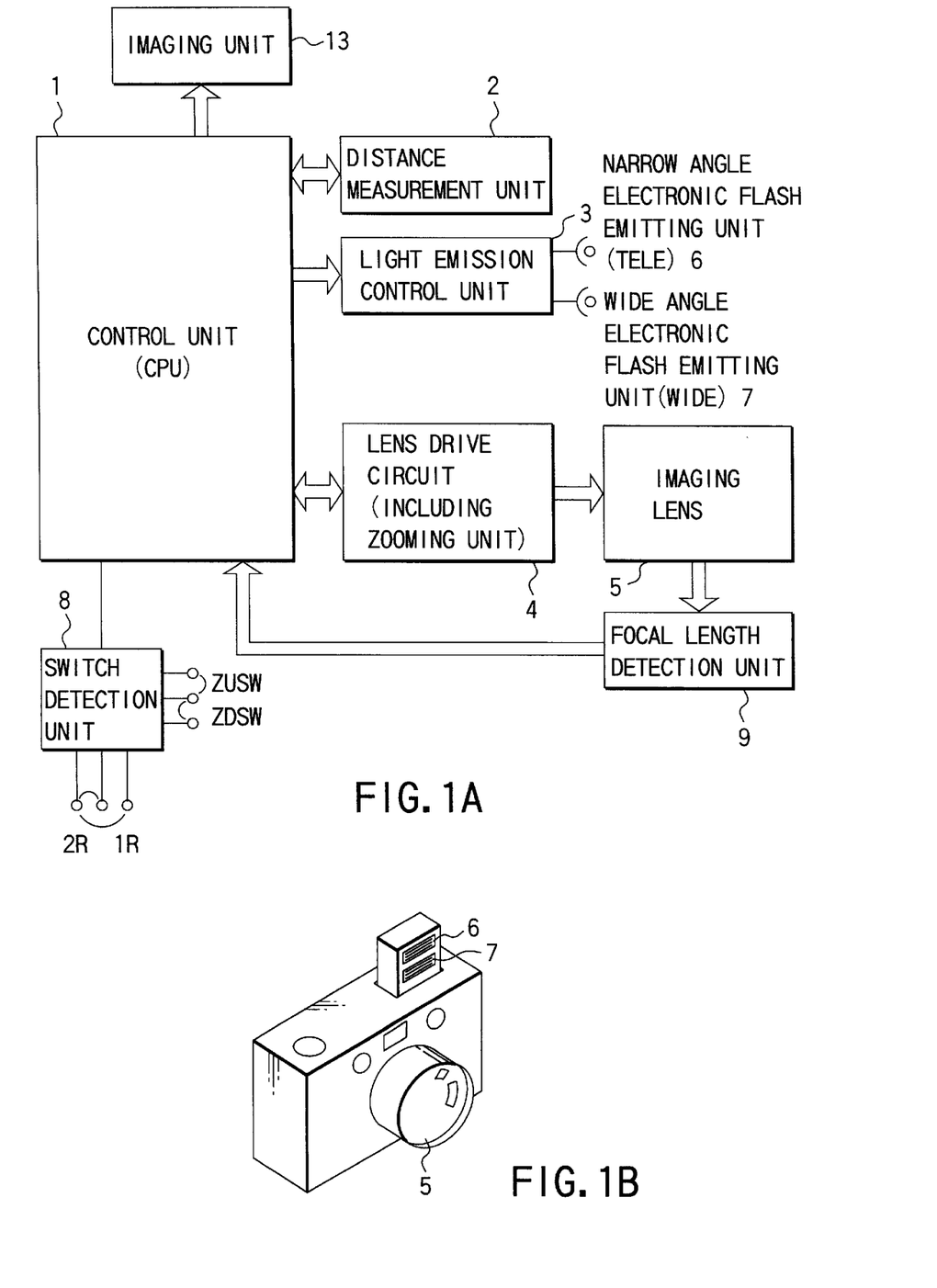
FIG. 1A is a view showing the structure of a camera according to the first embodiment.
FIG. 1B is a perspective view of the camera according to the first embodiment.

FIG. 1A is a view showing the structure of a camera according to the first embodiment, and FIG. 1B is a perspective view of the camera according to the first embodiment.

As shown in these figures, an output of a control unit for controlling the overall operation (to be referred to as CPU 1 hereinafter), is connected to inputs of a narrow angle electronic flash emitting unit 6 and a wide angle electronic flash emitting unit, via a light emission control unit 3. In this embodiment, the electronic flash emitting units 6 and 7 are separate members. It should be noted that the wide angle electronic flash emitting unit 7 has an irradiation angle (distribution angle) which covers the maximum imaging angle of the photographing lens, and the narrow angle electronic flash emitting unit 6 has an irradiation angle narrower than that of the wide angle electronic flash emitting unit 7.

The CPU 1 is further connected to a distance measurement unit 2, a lens drive circuit 4 and a switch detection unit 8 such that they can freely communicate with each other. The lens drive circuit 4 is connected to an imaging lens 5 via a mechanical structure. The switch detection means 8 is connected to a first release switch 1R designed such that it is turned on as the release button is pushed a half way through, and a second release switch 2R designed such that it is turned on as the release button is pushed all the way through, and further at least to a zoom up switch ZUSW and a zoom down switch ZDSW.

Besides the above-described structure, a focal length detection unit 9 for detecting the focal length of the photographing lens 5 is provided. The output of the focal length detection unit 9 is fed back to the CPU 1. It should be noted that the lens drive circuit 4 contains, other than the drive mechanism for focusing, a zooming unit for driving the lens for zooming of the photographing lens 5 and an imaging unit 13 for executing an exposure operation for exposing an object image onto a film, which is not shown. Further, in this embodiment, a phase difference mode is employed in the AF mode. The phase difference mode is a mode in which an object image formed by the photographing lens is separated into two images by a focus detection optical system and then re-unite them on a light receiving element, thus detecting the focusing state from the distance between these two images.

With the above-described structure, the light emission control unit 3 selects a narrow angle electronic flash emitting unit 6 which corresponds to the distance measurement area, under the control of the CPU 1 in the distance measurement operation by the distance measurement unit 2. In an actual distance measurement operation by the distance measurement unit 2, if the focal point cannot be detected due to some conditions of the object (for example, low brightness, low contrast, etc.), AF detection auxiliary light is emitted from thus selected narrow angle electronic flash emission unit 6.

When the zoom up switch ZUSW and the zoom down switch ZDSW are operated by the operator, the switch detection unit 8 detects the operation and data regarding zooming-down/zooming-up are transmitted to the CPU 1. The CPU 1 controls the lens drive circuit 4 on the basis of such data, so as to drive the photographing lens 5. The drive state of the photographing lens 5 is detected accordingly by the focal length detection unit 9, and its data is fed back to the CPU 1, thereby making it possible to appropriately adjust the focal point.

It should be noted that as the first release switch 1R is pressed down by the operator, a preset photometry and distance measurement operation are performed, and further as the second release switch 2R, a preset photographing operation is carried out. Details will be explained later.

Further, the first embodiment has the following feature. That is, particularly, when the distance is measured by the distance measurement unit 2 with the above-described structure and effect, a narrow angle electronic flash emitting unit 6 is selected by the light emission control unit 3 in accordance with the distance measurement area. In other words, even if the photographing lens 5 is on a wide angle side, the narrow angle electronic flash emitting unit 6 having a narrow irradiation angle regardless of the imaging angle, is used, thus making it possible to reduce the wasteful energy consumption.

Figure 2:
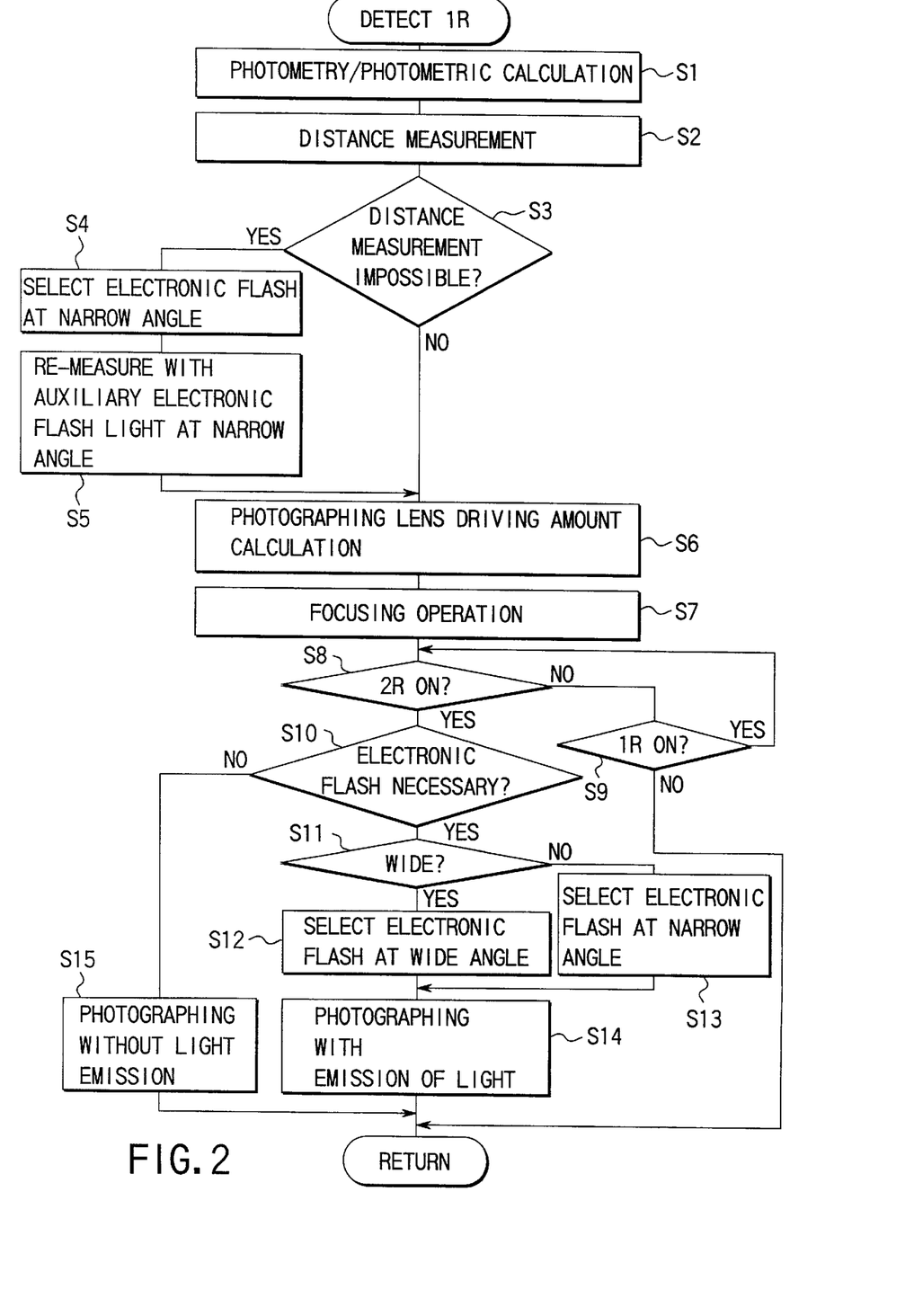
FIG. 2 is a flowchart illustrating the operation of the camera according to the first embodiment.

FIG. 2 is a flowchart which illustrates the operation of the camera according to the first embodiment having the above-described structure and effect.

When the release button is pushed half way through, the first release switch IR is turned on. When the switch detection unit 8 detects it, the operation enters the main sequence.

First, the CPU 1 carries out a preset photometry and photometric calculation (step S1) and then a distance measurement of a phase difference type, by the distance measurement unit 2 (step S2).

Next, in the case where the distance cannot be measured in the distance measurement operation, that is, an object cannot be appropriately measured due to low brightness (step S3), the narrow angle electronic flash emission unit 6 is selected by the light emission control unit 3 (step S4), and the distance is re-measured while emitting auxiliary light for AF detection from the narrow electronic flash emission unit 6 (step S5). If the distance is measured appropriately in the step S3, the operation moves onto the step S6 directly.

As described, this embodiment is characterized in the point that regardless of the imaging angle, the narrow angle electronic flash emission unit 6 having a narrow angle is selected in accordance with the distance measurement area.

Subsequently, in the step S6, the CPU 1 calculates the drive amount of the photographing lens 5 on the basis of the distance measurement result (step S6), and then carries out the focusing operation of the photographing lens via the lens drive circuit 4 on the basis of the calculation result (step S7).

Thus, while standing by for the second release switch 2R being pressed down, when the switch is pressed (steps S8 and S9), it is judged if photographing auxiliary light of a electronic flash is necessary or not (step S10) on the basis of the result of the photometric calculation (step S1).

In the case where the photographing auxiliary light of an electronic flash is judged to be unnecessary, the photographing operation is performed under the conditions for the case where no electronic flash is emitted (steps S10 and S15). By contrast, in the case where light emission by the electronic flash is necessary, the light emission control unit 3 selects either one of the narrow angle electronic flash emission unit 6 and the wide lens electronic flash emission unit 7 on the basis of TELE/WIDE data, and carries out a predetermined photographing operation with light emission of the electronic flash (steps S10 to S14). Thus, the photographing operation for one frame of a film is completed.

Figure 3A:
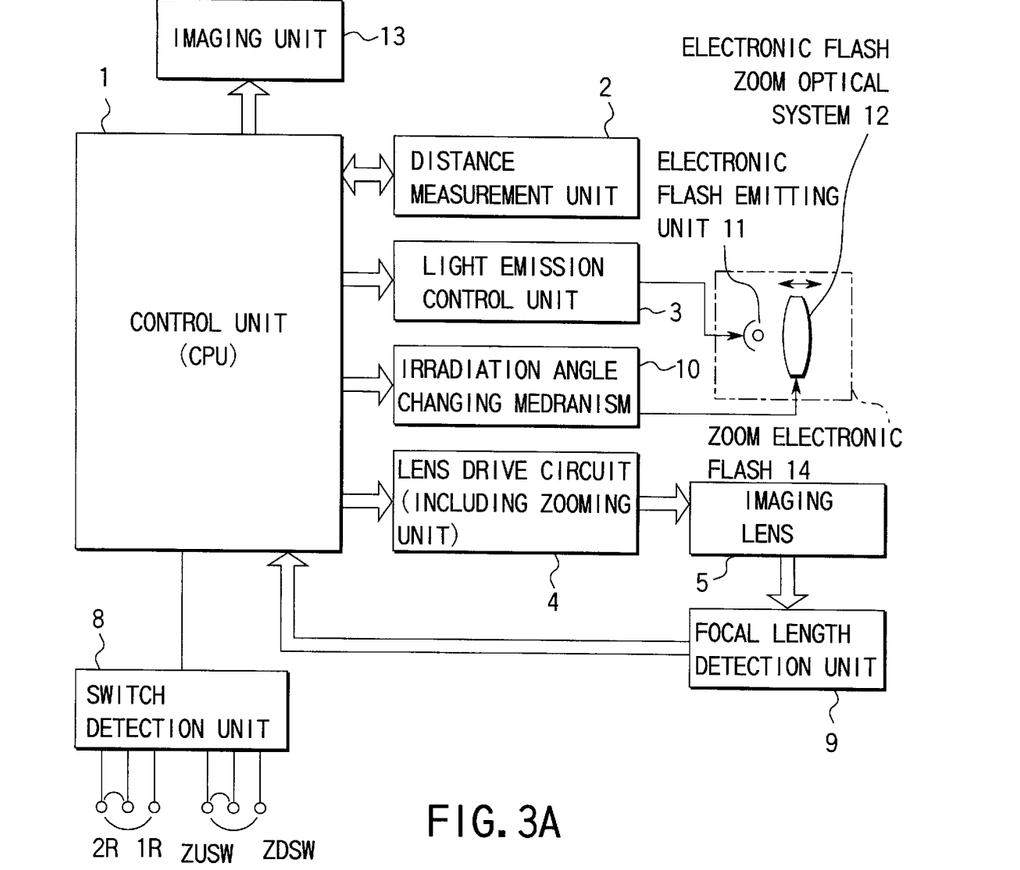
FIG. 3A is a view showing the structure of a camera according to the second embodiment.
Figure 3B:
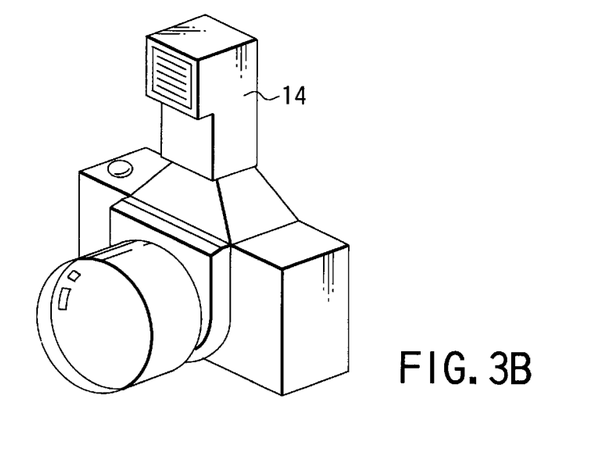
FIG. 3B is a perspective view of the camera according to the second embodiment.

FIG. 3A is a view showing the structure of a camera according to the second embodiment, and FIG. 3B is a perspective view of the camera.

As shown in these figures, an output of a control unit for controlling the overall operation (to be referred to as CPU 1 hereinafter), is connected to inputs of an electronic flash emitting unit 11 via a light emission control unit 3. In this embodiment, the electronic flash emitting unit 11 is capable of changing its irradiation angle by driving a strobo zoom optical system 12 under the drive control of an irradiation angle changing mechanism 10.

The CPU 1 is further connected to a distance measurement unit 2, a lens drive circuit 4 and a switch detection unit 8 such that they can freely communicate with each other. The lens drive circuit 4 is connected to an imaging lens 5 via a mechanical structure. The switch detection means 8 is connected to a first release switch 1R designed such that it is turned on as the release button is pushed a half way through, and a second release switch 2R designed such that it is turned on as the release button is pushed all the way through, and further at least to a zoom up switch ZUSW and a zoom down switch ZDSW.

Besides the above-described structure, a focal length detection unit 9 for detecting the focal length of the photographing lens 5 is provided, and the output of the unit 9 is fed back to the CPU 1. It should be noted that the lens drive circuit 4 contains, other than the drive mechanism for focusing, a zooming unit for driving the lens for zooming of the photographing lens 5 and an imaging unit 13 for executing an exposure operation for exposing an object image onto a film, which is not shown. Further, in this embodiment, a phase difference mode is employed in the AF mode.

With the above-described structure, before the distance measurement operation of the distance measurement unit 2, the irradiation angle of the electronic flash emitting unit 11 is adjusted to a narrow angle side by driving the electronic flash zoom optical mechanism 12 as the irradiation angle changing mechanism 10 operations under the control of the CPU 1.

Therefore, in the distance measurement operation by the distance measurement unit 2, AF detection auxiliary light is emitted from the electronic flash emission unit 11 at an irradiation angle of the narrow angle end.

When the zoom up switch ZUSW and the zoom down switch ZDSW are operated by the operator, the switch detection unit 8 detects the operation and data regarding zooming-down/zooming-up are transmitted to the CPU 1. The CPU 1 controls the lens drive circuit 4 on the basis of such data, so as to drive the photographing lens 5. The drive state of the photographing lens 5 is detected accordingly by the focal length detection unit 9, and its data is fed back to the CPU 1, thereby making it possible to appropriately adjust the focal point.

It should be noted that as the first release switch 1R is pressed down by the operator, a preset photometry and distance measurement operation are performed, and further as the second release switch 2R, a preset photographing operation is carried out. Details will be explained later.

Further, the second embodiment has the following feature. That is, in the light emission upon photographing, the electronic flash zoom optical system 12 is driven so that the imaging angle and the irradiation angle of the electronic flash emission unit 11 coincide. In the distance measurement, the electronic flash zoom optical system 12 is driven so that the irradiation angle of the electronic flash emission unit 11 becomes narrower than the imaging angle. It should be noted that the minimum value (>distance measurement area) is defined to prevent excessive narrowing of the irradiation angle. Details will be provided later.

Figure 4:
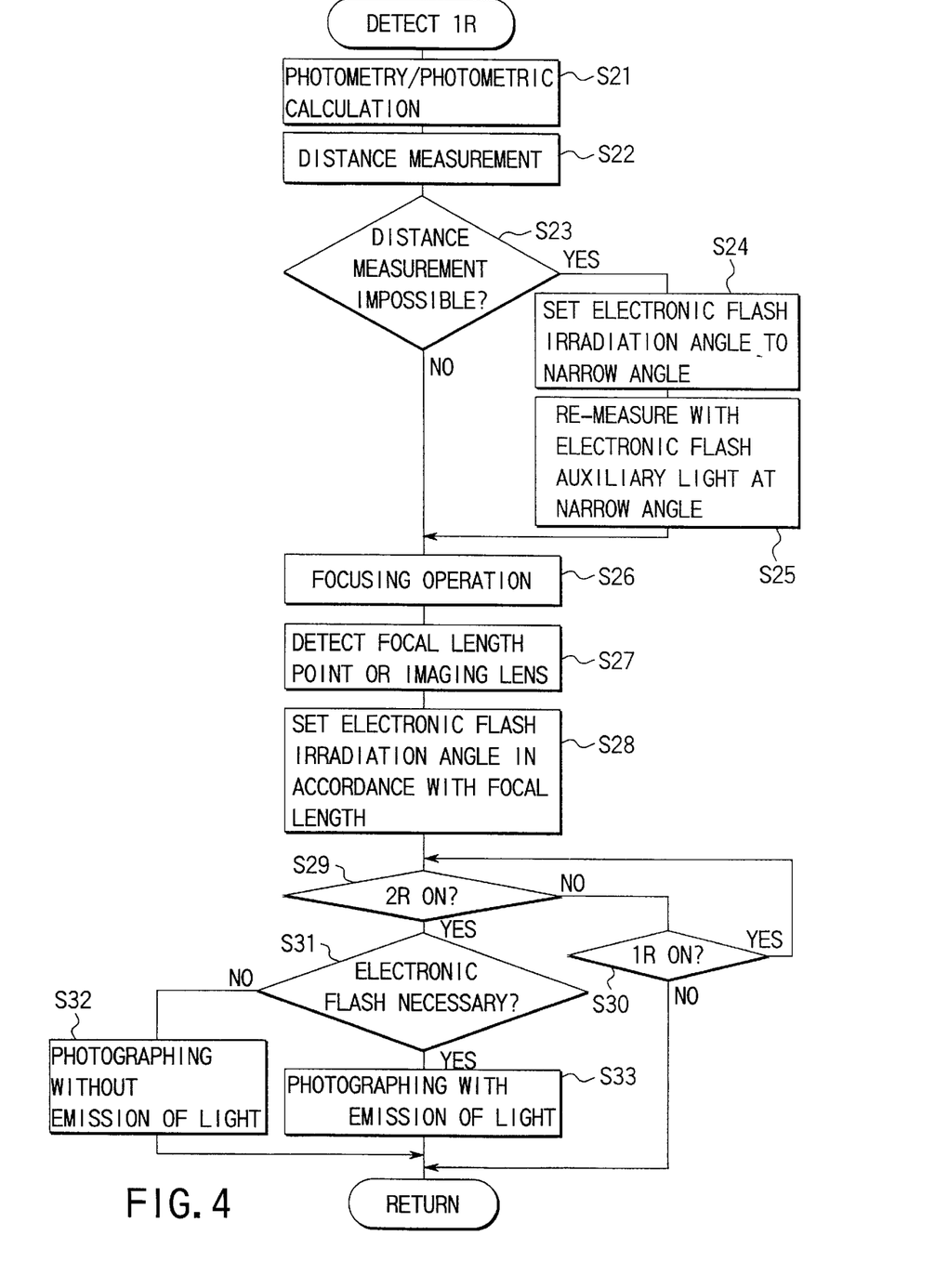
FIG. 4 is a flowchart illustrating the operation of the camera according to the second embodiment.

FIG. 4 is a flowchart which illustrates the operation of the camera according to the second embodiment having the above-described structure and effect.

When the release button is pushed half way through, the first release switch 1R is turned on. When the switch detection unit 8 detects it, the operation enters the main sequence.

First, the CPU 1 carries out a preset photometry and photometric calculation (step S21) and then a distance measurement of a phase difference type is carried out by the distance measurement unit 2 (step S22).

Next, in the case where the distance cannot be measured in the distance measurement operation, that is, an object cannot be appropriately measured due to low brightness (step S23), the irradiation angle of the electronic flash emission unit 11 is set to the end of the narrow angle side, that is, the irradiation angle of the narrowest angle side (step S24), and the distance is re-measured while emitting auxiliary light(step S25). Here, the "narrow angle end" of the electronic flash irradiation angle is determined uniquely regardless of the imaging angle or distance measurement area.

If the distance is measured appropriately in the step S23, the operation moves onto the step S26 directly.

Subsequently, the CPU 1 calculates the drive amount of the photographing lens 5 on the basis of the distance measurement result obtained by the distance measurement unit 2, and then carries out the focusing operation of the photographing lens 5 via the lens drive circuit 4 on the basis of the calculation result (step S26).

Further, the CPU 1 detects the focal length of the photographing lens 5 by the focal length detection unit 9 (step S27), and drives the electronic flash zoom optical system 12 via the irradiation angle changing mechanism 10 on the basis of the detection result, thus setting the irradiation angle of the electronic flash emission unit 11 to the angle corresponding to the above focal length (step S28).

Thus, while standing by for the second release switch 2R being pressed down, when the switch is pressed (steps S29 and S30), it is judged if photographing auxiliary light of an electronic flash is necessary or not (step S31) on the basis of the result of the photometric calculation (step S21).

In the case where the photographing auxiliary light of an electronic flash is judged to be unnecessary, the photographing operation is performed under the conditions for the case where no electronic flash is emitted (step S32). By contrast, in the case where light emission by the electronic flash emission unit 11 is necessary, a predetermined photographing operation is carried out with light emission of the electronic flash emission unit 11 (step S33). Thus, the photographing operation for one frame of a film is completed.

Figure 5:
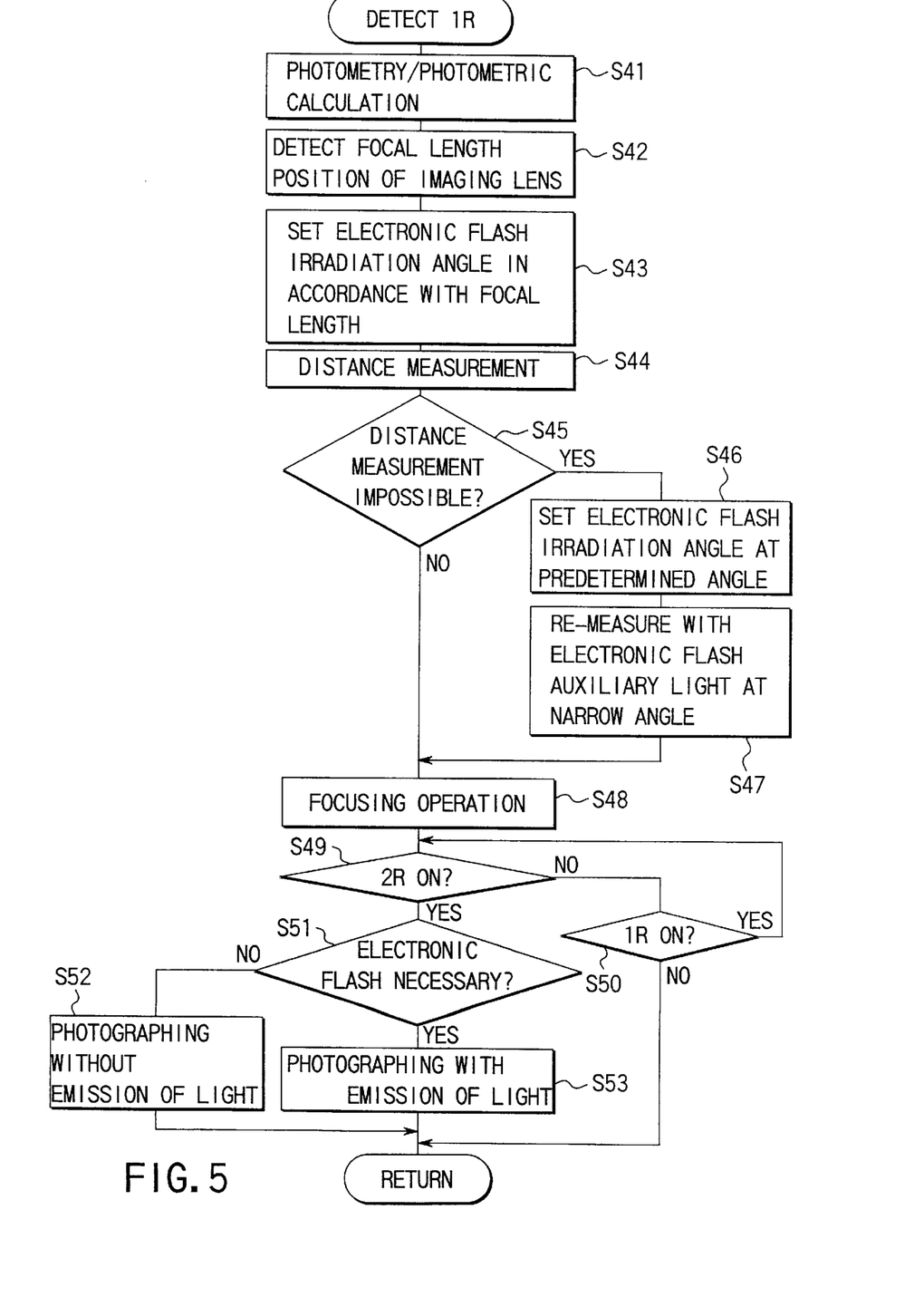
FIG. 5 is a flowchart illustrating the operation of a remodeled version of the camera according to the second embodiment.

With reference to a flowchart of FIG. 5, the operation of the camera according to a remodeled version of the second embodiment having the above-described structure and effect, will now be described.

When the release button is pushed half way through, the first release switch 1R is turned on. When the switch detection unit 8 detects it, the operation enters the main sequence.

First, the CPU 1 carries out a preset photometry and photometric calculation (step S41).

Then, the CPU 1 detects the focal length of the photographing lens 5 by the focal length detection unit 9 (step S42), and drives the electronic flash zoom optical system 12 via the irradiation angle changing mechanism 10 on the basis of the detection result, thus setting the irradiation angle of the electronic flash emission unit 11 to the angle corresponding to the above focal length (step S43). Subsequently, the distance measurement of the phase difference mode is carried out by the distance measurement unit 2 (step S44).

Next, in the case where the distance cannot be measured in the distance measurement operation, that is, an object cannot be appropriately measured due to low brightness (step S45), the irradiation angle of the electronic flash emission unit 11 is set to a predetermined angle (step S46), and the distance is re-measured while emitting electronic flash auxiliary light (step S47). Here, the "predetermined angle" is an irradiation angle which is appropriate for the distance measurement area. In general, when the electronic flash irradiation angle is set to the narrow angle end, it is possible that the irradiation area becomes narrower than the focus area in a wide AF operation. Therefore, with the "predetermined angle" set here, such a drawback can be avoided. The data of the predetermined angle is stored in, for example, an internal memory of the CPU 1, and read out from there in accordance with necessity.

If the distance is measured appropriately in the step S45, the operation moves onto the step S48 directly.

Subsequently, the CPU 1 calculates the drive amount of the imaging lens 5 on the basis of the distance measurement result obtained by the distance measurement unit 2, and then carries out the focusing operation of the imaging lens 5 via the lens drive circuit 4 on the basis of the calculation result (step S48).

Thus, while standing by for the second release switch 2R being pressed down, when the switch is pressed (steps S49 and S50), it is judged if imaging auxiliary light of an electronic flash is necessary or not (step S51) on the basis of the result of the photometric calculation (step S41).

In the case where the imaging auxiliary light of an electronic flash is judged to be unnecessary, the imaging operation is performed under the conditions for the case where no electronic flash is emitted (step S52).

By contrast, in the case where light emission by the electronic flash is necessary, a predetermined imaging operation is carried out with light emission of the electronic flash (step S53). Thus, the imaging operation for one frame of a film is completed.

Next, the third embodiment of the present invention will now be described.

It should be noted that the structure of the camera according to the third embodiment is similar to that of the second embodiment, and therefore the description of the similar part will not be repeated here. In the following description, the same structural elements as those shown in FIG. 3 will be designated by the same reference numerals, and the characterizing effects of this embodiment will be described.

Figure 6:
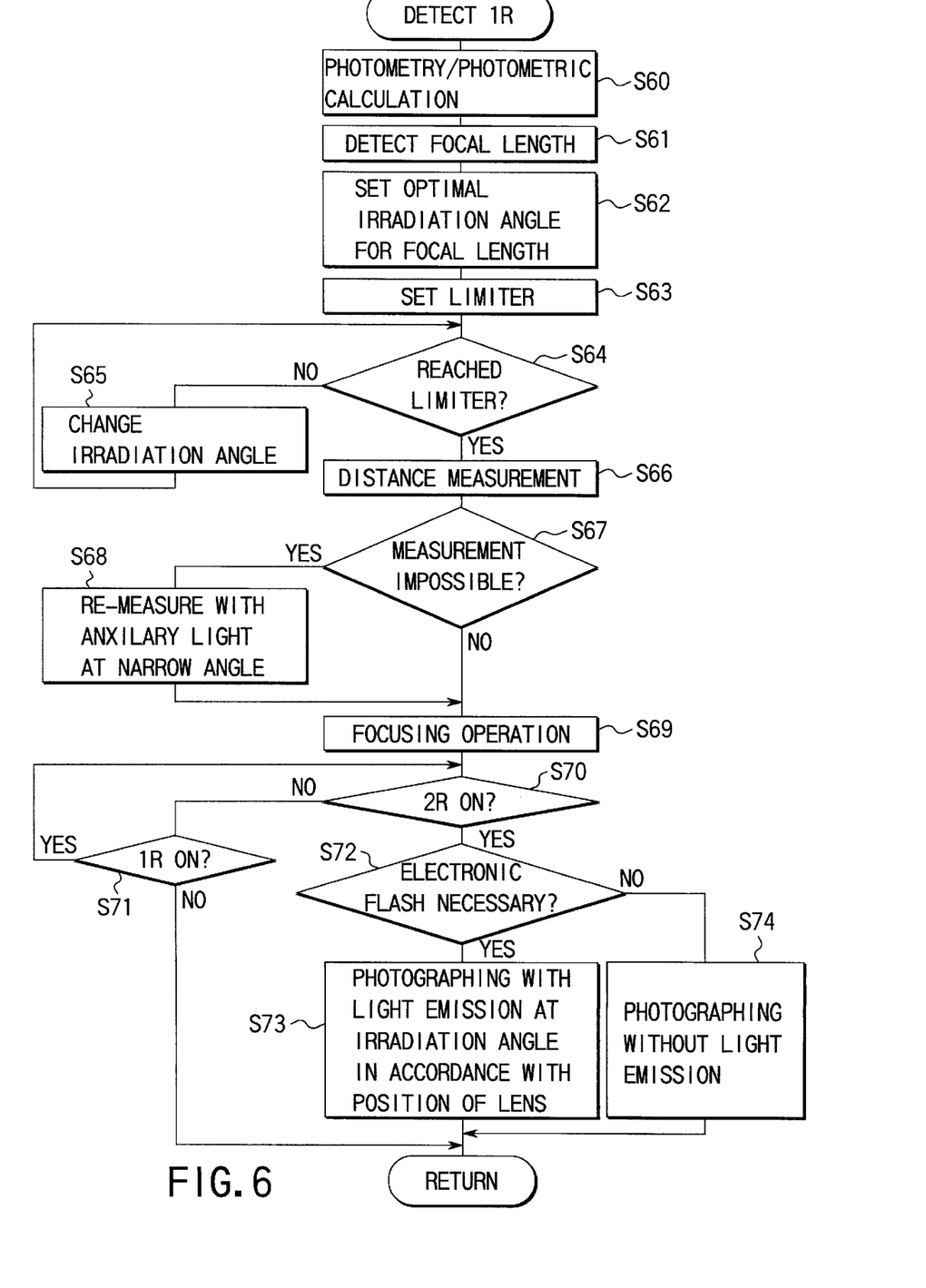
FIG. 6 is a flowchart illustrating the operation of the camera according to the third embodiment.

With reference to a flowchart of FIG. 6, the operation of the camera according to the third embodiment will now be described.

When the release button is pushed half way through, the first release switch 1R is turned on. When the switch detection unit 8 detects it, the operation enters the main sequence.

First, the CPU 1 carries out a preset photometry and photometric calculation (step S60).

Then, the CPU 1 detects the focal length of the photographing lens 5 by the focal length detection unit 9 (step S61), and drives the electronic flash zoom optical system 12 via the irradiation angle changing mechanism 10 on the basis of the detection result, thus setting the irradiation angle of the electronic flash emission unit 11 to the angle corresponding to the above focal length (step S62).

Subsequently, the limiter value of the irradiation angle optimal to the lens position (that is, the value which does not become narrower than the distance measurement area) is set (step S63), and the irradiation angle is changed until it reaches the limiter value (steps S64 and S65).

Then, the distance measurement of the phase difference mode is carried out by the distance measurement unit 2 (step S66). In the case where the distance cannot be measured in the distance measurement operation, that is, an object cannot be appropriately measured due to low brightness (step S67), the distance is re-measured while emitting electronic flash auxiliary light (step S68).

Here, in the above-described steps S63 to S65, the irradiation angle of the electronic flash is already set to the optimal angle which corresponds to the focal length, and therefore the adverse effect of the time lag which is created from a distance measurement operation to a re-measurement will be reduced. This is the main feature of the third embodiment.

Next, the CPU 1 calculates the drive amount of the imaging lens 5 on the basis of the distance measurement result obtained by the distance measurement unit 2, and then carries out the focusing operation of the imaging lens 5 via the lens drive circuit 4 on the basis of the calculation result (step S69).

Thus, while standing by for the second release switch 2R being pressed down, when the switch is pressed (steps S70 and S71), it is judged if imaging auxiliary light of an electronic flash is necessary or not (step S72) on the basis of the result of the photometric calculation (step S61).

In the case where the imaging auxiliary light of an electronic flash is judged to be unnecessary, the imaging operation is performed under the conditions for the case where no electronic flash is emitted (step S74). By contrast, in the case where light emission by the electronic flash is necessary, a predetermined imaging operation is carried out with light emission of the electronic flash (step S73). Thus, the imaging operation for one frame of a film is completed.

As described, according to the third embodiment, prior to the distance measurement operation, the irradiation angle of the electronic flash is set to the optimal angle which corresponds to the focal length, and therefore the adverse effect of the time lag which is created from a distance measurement operation to a re-measurement can be reduced.

According to the present invention, the electronic flash device is controlled automatically to emit light at narrow angle for the case where auxiliary light is emitted, and therefore the auxiliary light use efficiency can be improved while covering the AF detection area only, thus making it possible to save the consumption energy without wasting it.

As described above in detail, according to the present invention, it becomes possible to provide a camera which can appropriately control the electronic flash irradiation area when the electronic flash device capable of setting its irradiation angle in a plurality of ways, is used as an AF auxiliary light source, thus improving the use efficiency of the auxiliary light and reducing wasteful energy consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a zoom lens;

detection means for detecting a focal length of the zoom lens;

electronic flash means for irradiating electronic flash onto an object to be photographed, capable of setting a first irradiation angle to cover an image view angle of a wide angle side of the zoom lens, and a second irradiation angle which is narrower than the first irradiation angle;

first selection means for selecting either one of the first and second irradiation angles in accordance with the focal length detected by the detection means;

distance measurement means for measuring a distance to the object to be photographed, located in a distance measurement area within an imaging view angle, by operating the electronic flash means on the basis of object conditions; and second selection means for selecting the second irradiation angle regardless of the selection made by the first selection means, when the distance to the object is measured with use of the electronic flash means.

2. A camera comprising:

a zoom lens;

detection means for detecting a focal length of the zoom lens;

electronic flash means for irradiating electronic flash onto an object to be photographed, capable of changing its irradiation angle;

first irradiation angle setting means for setting an irradiation angle of the electronic flash means in accordance with the focal length detected by the detection means;

distance measurement means for measuring a distance to the object to be photographed, located in a distance measurement area within an imaging view angle, by operating the electronic flash means on the basis of object conditions; and second irradiation angle setting means for setting an irradiation angle of the electronic flash means when the distance to the object is measured with use of the electronic flash means.

3. A camera according to claim 2, wherein the predetermined irradiation angle is narrower than an imaging angle.

4. A camera according to claim 2, wherein the predetermined irradiation angle covers the distance measurement area.

5. A camera according to claim 2, wherein the predetermined irradiation angle is at a narrow angle end of irradiation angles which can be set.

6. A camera according to claim 2, wherein the electronic flash means includes a plurality of electronic flash emitting units having irradiation angles different from each other.

7. A camera comprising:

an imaging lens capable of varying a focal length;

electronic flash means for irradiating electronic flash onto an object to be photographed;

imaging means for executing an imaging operation with use of the electronic flash means when the object to be photographed has a low brightness;

distance measurement means for measuring a distance to the object to be photographed, located in a distance measurement area within an image plane, by operating the electronic flash means to emit light on the basis of object conditions; and irradiation angle setting means for setting an irradiation angle of the electronic flash means in accordance with the focal distance of the imaging lens in the imaging operation, and for setting the irradiation angle of the electronic flash means at a predetermined angle when the measurement distance is measured with use of the electronic flash means.

8. A camera comprising:

an imaging lens capable of varying a focal length;

electronic flash means for irradiating electronic flash onto an object to be photographed;

imaging means for executing an imaging operation;

distance measurement means for measuring a distance to the object to be photographed, located in a distance measurement area within an image plane; and control unit for setting an irradiation angle of the electronic flash means at an appropriate angle for the distance measurement area when the measurement distance is measured with use of the electronic flash means to emit light, and setting the irradiation angle of the electronic flash means in accordance with the focal distance of the imaging lens in the imaging operation.

9. A camera comprising:

imaging angle changing means;

an electronic flash unit for irradiating electronic flash onto an object to be photographed;

electronic flash irradation angle changing means for changing an irradation angle of the electronic flash unit;

distance measurement means having a distance measurement area within an image plane, for outputting a signal for adjusting a focal point of an imaging lens; and control means for setting the electronic flash irradation angle at a narrow angle side when the measurement distance is measured in cooperation with the electronic flash unit.

10. A camera according to claim 9, wherein the irradiation angle on the narrow angle side, set by the control means contains at least the distance measurement area therewithin.

11. A camera according to claim 9, wherein the control means controls the electronic flash irradiation angle changing means so that the irradiation angle on the narrow angle side, set by the control means does not become smaller than that of the distance measurement area.

12. A camera comprising:

distance measurement means for outputting a signal necessary for a focusing operation;

detection means for detecting an imaging angle; and an artificial light source for irradiating light onto an object to be photographed at a distribution light angle at least a same as or narrower than the imaging angle detected by the detection means, out of a plurality of distribution light angles.

13. A camera according to claim 12, wherein the irradiation of light by the artificial light source is performed before an exposure.

14. A camera according to claim 12, wherein the irradiation of light by the artificial light source is performed when the distance measurement means cannot appropriately measure the distance.

15. A camera according to claim 14, wherein a situation that the distance measurement means cannot appropriately measure the distance is when the field of the object is darker than a predetermined brightness.

16. A camera according to claim 14, wherein a situation that the distance measurement means cannot appropriately measure the distance is when the object has no contrast.

17. A camera according to claim 12, wherein the irradiation of light by the artificial light source is done by an electronic flash device.

18. A camera comprising:

an artificial light source capable of changing a light distribution angle;

imaging means for carrying out an imaging operation with use of the artificial light source;

distance measurement means for executing a distance measurement operation for outputting a signal necessary for a focusing operation, using the artificial light source; and control means for switching a light distribution angle of the artificial light source over between a case where the photographing is executed by irradiating an object with the artificial light source and a case where the distance measurement operation is executed by irradiating an object with the artificial light source.

19. A camera according to claim 18, wherein the distribution light angle at least at the photographing is the same as or wider than the distribution light angle at the distance measurement operation.

20. A camera comprising:
   distance measurement unit for measuring a distance from an object to be photographed;
   a light emitting unit having at least two types of irradiation angles, a wide angle and narrow angle;
   a zooming unit for determining an imaging angle; and
   a control unit for irradiating an object to be photographed at a narrow irradiation angle without regard to the imaging angle when measuring the distance.

21. A camera according to claim 20, wherein the light emitting unit is an electronic flash device.

22. A camera comprising:
   distance measurement unit for measuring a distance from an object to be photographed, for focusing;
   a light emitting unit capable of changing an irradiation angle from a wide angle to a narrow angle;
   a zooming unit for changing an imaging angle from a wide-mode to a tele-mode; and
   a control unit for irradiating an object to be photographed at a narrow irradiation angle without regard to the imaging angle when measuring the distance.

23. A camera according to claim 22, wherein the light emitting unit is a zoom electronic flash device.

24. A camera according to claim 22, wherein a wide angle end of the light emitting unit covers at least the imaging angle at a wide-mode end of the zooming unit.

25. A camera according to claim 22, wherein a narrow angle end of the light emitting unit covers at least the distance measurement area at a tele-mode end of the zooming unit.

26. A camera according to claim 22, wherein the irradiation angle of the light emitting unit corresponds to the distance measurement area narrower than the imaging angle determined by the zooming unit.

27. A camera according to claim 22, further comprising a irradiation angle changing mechanism operation so that the irradiation angle of the light emitting unit does not become narrower than the distance measurement area in the imaging screen.

28. A camera comprising:
   a zoom lens;
   a focal length detection unit for detecting a focal length position of the zoom lens;
   a distance measurement unit for measuring a distance from an object to be photographed;
   a light emitting unit capable of changing an irradiation angle from a wide angle to a narrow angle, for irradiating light; and
   a control unit for setting the irradiation angle of the light emitting unit at an optimal angle for the focal length position before carrying out a distance re-measurement operation which involves auxiliary light emitted by the light emitting unit, when a distance measurement by the distance measurement unit fails, thereby shortening a time lag created between the distance measurement to the distance re-measurement which involves the auxiliary light.

* * * * *